(12) United States Patent
Soga et al.

(10) Patent No.: US 8,146,116 B2
(45) Date of Patent: Mar. 27, 2012

(54) DISK DEVICE HAVING A CLAMPER RESTRICTING MEMBER

(75) Inventors: Hideto Soga, Osaka (JP); Tomio Yamamoto, Hyogo (JP); Tadashi Maeoka, Osaka (JP); Asayuki Matsumura, Osaka (JP)

(73) Assignee: Panasonic Corporation, Osaka (JP)

( * ) Notice: Subject to any disclaimer, the term of this patent is extended or adjusted under 35 U.S.C. 154(b) by 801 days.

(21) Appl. No.: 12/161,645

(22) PCT Filed: Nov. 13, 2007

(86) PCT No.: PCT/JP2007/071974
§ 371 (c)(1),
(2), (4) Date: Jul. 21, 2008

(87) PCT Pub. No.: WO2008/059820
PCT Pub. Date: May 22, 2008

(65) Prior Publication Data
US 2010/0235850 A1 Sep. 16, 2010

(30) Foreign Application Priority Data
Nov. 15, 2006 (JP) ................................ 2006-309110

(51) Int. Cl.
*G11B 17/04* (2006.01)
(52) U.S. Cl. ........................................ 720/713; 720/707
(58) Field of Classification Search .................. 720/604, 720/706, 707, 709, 712, 720, 710, 713
See application file for complete search history.

(56) References Cited

U.S. PATENT DOCUMENTS

| 6,891,780 | B1 | 5/2005 | Kage et al. | |
|---|---|---|---|---|
| 7,395,543 | B2 * | 7/2008 | Seol et al. | 720/658 |
| 7,917,919 | B2 * | 3/2011 | Hamaguchi | 720/713 |
| 2004/0268377 | A1 * | 12/2004 | Azai | 720/710 |
| 2005/0097589 | A1 * | 5/2005 | Hara et al. | 720/710 |

(Continued)

FOREIGN PATENT DOCUMENTS

JP 1-176362 7/1989

(Continued)

OTHER PUBLICATIONS

Patent Cooperation Treaty (PCT) International Preliminary Report on Patentability, issued May 26, 2009 in corresponding International Application No. PCT/JP2007/071974.

(Continued)

*Primary Examiner* — Brian Miller
(74) *Attorney, Agent, or Firm* — Wenderoth, Lind & Ponack, L.L.P.

(57) ABSTRACT

A disk device includes a turntable which is rotationally driven and, for placing a disk thereon, a clamper for rotatably holding the disk between the turntable and the clamper, a loading mechanism for carrying the disk inserted to between the turntable and the clamper, a clamp arm which includes a clamper holder for rotatably holding the clamper by a claw fitted to the hook with a clearance and an arm unit disposed pivotably on a pivot shaft positioned apart from the clamper holder, the clamp arm moving the clamper between a disk pressing position and a retreat position, and a clamper restricting member including a resilient portion capable of contacting a part of the clamper on the side opposite to the side of the clamper moved to the retreat position and on a side apart from the pivot shaft of the arm unit.

3 Claims, 12 Drawing Sheets

U.S. PATENT DOCUMENTS

| | | | |
|---|---|---|---|
| 2006/0174255 A1* | 8/2006 | Chuo | 720/706 |
| 2006/0268454 A1* | 11/2006 | Nishide | 360/99.12 |
| 2007/0011697 A1* | 1/2007 | Kido | 720/713 |

FOREIGN PATENT DOCUMENTS

| | | | |
|---|---|---|---|
| JP | 9-17081 | | 1/1997 |
| JP | 10092099 | * | 4/1998 |
| JP | 10-312628 | | 11/1998 |
| JP | 11016337 | * | 1/1999 |
| JP | 2000-67495 | | 3/2000 |
| JP | 2000067495 | * | 3/2000 |
| JP | 2000-298904 | | 10/2000 |
| JP | 2002-319216 | | 10/2002 |
| JP | 2003-123353 | | 4/2003 |

OTHER PUBLICATIONS

International Search Report issued Dec. 25, 2007 in the International (PCT) Application of which the present application is the U.S. National Stage.

* cited by examiner

DISK DEVICE HAVING A CLAMPER RESTRICTING MEMBER

TECHNICAL FIELD

The present invention relates to a disk device for recording and reproducing information in and from a disk-shaped recording medium.

BACKGROUND ART

There has been recently increased diversification of a commodity product having a disk device loaded thereon, for recording and reproducing information in and from a disk-shaped recording medium (hereinafter simply referred to as "a disk") such as a CD (abbreviating "a compact disk") or a DVD (abbreviating "a digital versatile disk"). Therefore, the device is required to be reduced in size and thickness for the purpose of combination with other devices.

Explanation will be made below on a conventional disk device.

The conventional disk device is exemplified by a device disclosed in Patent Document 1 (i.e., Japanese Unexamined Patent Publication No. H1-176362 A). This conventional disk device will be described in reference to FIGS. 12A and 12B.

FIG. 12A is a cross-sectional view showing, in partly enlargement, a conventional disk device in a state in which a disk is being loaded; and FIG. 12B is a cross-sectional view showing, in partly enlargement, the conventional disk device in a state in which the loading of the disk is completed.

As shown in FIG. 12A, the conventional disk device includes: a support board 90; a loading tray 95 for carrying a disk 91 above the support board 90; a turntable 94 turnably mounted on the support board 90; a clamp arm 93 pivotably fitted at one end thereof to a turn shaft 93a which is disposed at an end of the support board 90 and serves as a fulcrum; a clamper 92 fixed at the other end of the clamp arm 93 and being capable of clamping the disk 91 to the turntable 94 in contact with the disk 91 carried above the support board 90 by the loading tray 95 according to the pivot of the clamp arm 93; and an optical pickup (not shown) for reading and writing information from and in the disk 91.

A description will be given of a disk clamping operation in the disk device such constituted as described above.

First of all, the disk 91 is placed on the loading tray 95. The disk 91 is guided through between the turntable 94 and the clamper 92 according to the movement of the loading tray 95, and then, is carried above the turntable 94, as shown in FIG. 12A. Thereafter, the disk 91 is descended on the turntable 94, and at the same time, the clamper 92 is descended on the disk 91 according to the pivot of the clamp arm 93. With this operation, the disk 91 is clamped by the clamper 92, thus to be turned integrally with the turntable 94, as shown in FIG. 12B.

DISCLOSURE OF THE INVENTION

Problems to be Solved by the Invention

In the above-described conventional disk device, sufficient clearances (i.e., looseness) are defined in a radial direction of the disk 91 (i.e., in a lateral direction in FIG. 12A) and in a rotary shaft direction perpendicular to the radial direction (i.e., in a vertical direction in FIG. 12A) between the clamper 92 and the clamp arm 93 in consideration of variations of dimensions of component parts or vibrations such that the clamper 92, which clamps the disk 91, cannot be brought into contact with the clamp arm 93 during the rotation of the disk 91 after the completion of loading of the disk 91 onto the turntable 94.

Therefore, when the clamper 92 does not clamp the disk 91, for example, when the disk is being loaded, the clamper 92 is held at all times in a state suspended from the clamp arm 93 by its own weight. In other words, the clamper 92 is designed to be held, by the clearance in the rotary shaft direction defined between the clamper 92 and the clamp arm 93, near the disk 91 to be loaded.

In view of this, in order to prevent the disk 91 from being damaged in contact with the clamper 92 during the disk loading, the clamp arm 93 supporting the clamper 92 thereon need be positioned in the rotary shaft direction in consideration of the clearance defined between the clamper 92 and the clamp arm 93 in the rotary shaft direction. That is to say, the clamp arm 93 need be disposed to be separated more than the above-described clearance from the disk 91 to be loaded.

The present invention has been accomplished to solve the above-described problem. Therefore, an object of the present invention is to provide a disk device, in which a disk can be prevented from being damaged, and further, a thickness can be reduced.

Means for Solving the Problems

In order to solve the problems experienced by the related art, the present invention is configured, as follows:

According to a first aspect of the present invention, there is provided a disk device comprising:

a turntable housed inside a casing, which is rotationally driven by a spindle motor, for placing a disk thereon;

a clamper for rotatably holding the disk between the turntable and the clamper, which has a hook on a side opposite to a side on which the disk is held;

a loading mechanism for carrying the disk inserted from outside of the casing to between the turntable and the clamper;

a clamp arm which includes a clamper holder for rotatably holding the clamper by a claw fitted to the hook of the clamper with a clearance in a thickness direction of the clamper and an arm unit extending from the clamper holder and disposed pivotably on a pivot shaft positioned apart from the clamper holder, the clamp arm moving the clamper between a disk pressing position at which the disk is pressed onto the turntable and a retreat position apart from the disk pressing position toward a side remote from the turntable according to the pivot of the arm unit; and a clamper restricting member including a resilient portion capable of contacting a part of the clamper on the side opposite to the side on which the disk is held, and on a side apart from the pivot shaft of the arm unit with the clamper moved to the retreat position;

wherein when the part of the clamper moved to the retreat position by the pivot of the arm unit of the clamp arm brings into contact with the resilient portion of the clamper restricting member, a side near the pivot shaft of the arm unit of the clamper is pivoted in a direction apart from the turntable on a contact portion, serving as a fulcrum, between the hook positioned in vicinity of the part of the contacting clamper and the claw of the clamper holder in the clamp arm.

According to a second aspect of the present invention, there is provided the disk device as defined in the first aspect, wherein the resilient portion of the clamper restricting member formed so as to pass the center of rotation of the clamper and be substantially symmetrically with respect to a plane perpendicular to the pivot shaft of the arm unit.

According to a third aspect of the present invention, there is provided the disk device as defined in the second aspect, wherein the resilient portion of the clamper restricting member has a plurality of resilient claws, each of which extends in a direction near the pivot shaft of the arm unit; and the resilient claws adjacent each other are connected to each other at portions on a side, apart from the pivot shaft of the arm unit, out of contact with the clamper, thus to be integrated with each other.

According to a fourth aspect of the present invention, there is provided the disk device as defined in the second aspect, wherein the clamper restricting member includes a leaf spring having an opening at a center thereof.

According to a fifth aspect of the present invention, there is provided the disk device as defined in the fourth aspect, wherein the arm unit of the clamp arm is partly or entirely constituted of a resilient member;

an elastic modulus of the resilient member is greater than that of the resilient portion of the clamper restricting member.

Effects of the Invention

The disk device according to the first aspect of the present invention is configured such that when the part of the clamper moved to the retreat position brings into contact with the resilient portion of the clamper restricting member, the clamper is pivoted in the direction apart from the turntable on the side near the pivot shaft of the arm unit of the clamper on the contact portion, serving as the fulcrum, between the hook positioned in vicinity of the part of the abutting clamper and the claw of the clamper holder in the clamp arm. Consequently, the clearance between the clamp arm and the clamper can be eliminated by inclining the clamper with respect to the turntable to lift up a portion nearest the turntable. The clearance between the loading disk and the clamper can be enlarged by the eliminated clearance. In addition, the disk device is configured such that the resilient portion of the clamper restricting member brings into contact with the part of the clamper. As a consequence, it is possible to absorb variations of the pivot position of the clamp arm within the movable range of the resilient portion, and further, to securely restrict the position of the clamper with the inclination with respect to the clamp arm. Moreover, the disk device is configured such that the clearance between the clamp arm and the clamper can be eliminated by inclining the clamper with respect to the clamp arm by the biasing force of the resilient portion of the clamper restricting member. Thus, it is possible to stably keep the clearance even if vibrations are applied to the disk device, so as to reduce the thickness of the disk device by dimensions of the clearance between the clamper and the clamp arm and the variations of the posture due to the vibrations.

In the disk device according to the second aspect of the present invention, the resilient portion of the clamper restricting member passes the center of rotation of the clamper, and further, is formed substantially symmetrically with respect to a plane perpendicular to the pivot shaft of the arm unit. As a consequence, moment, which generates the inclination of the clamper with respect to the surface of the disk placed on the turntable by pressing the clamper at the plurality of points, is generated as a difference between moments generated at loads. Therefore, the inclination of the clamper can be suppressed to a level lower than that generated when the part of the clamper is pressed at one point. Thus, it is possible to enlarge the clearance between the loading disk and the clamper, so as to prevent the disk from being damaged.

In the disk device according to the third aspect of the present invention, the clamper restricting member brings into contact with the clamper via the plurality of resilient claws at the plurality of contact points, and further, the resilient claws adjacent each other are connected to each other at portions out of contact with the clamper, to be integrated with each other. As a consequence, all of the contact points on the side of the clamper restricting member are displaced in substantial association with each other. Consequently, even if the entire component part is slightly deformed by handling the component part during its machining or assembling, it is possible to prevent any generation of a large difference in pressing force against the clamper due to an excessive step formed between the plurality of contact points, so as to suppress the reduction of the clearance between the disk and the clamper due to the large inclination of the clamper. Thus, the disk can be prevented from being damaged.

In the disk device according to the fourth aspect of the present invention, the clamper restricting member according to the third aspect can be readily machined in a simple structure, thus preventing any damage on the disk.

In the disk device according to the fifth aspect of the present invention, since the elastic modulus of the clamper restricting member serving as the resilient member is set to a sufficiently level smaller than that of the resilient part of the clamp arm, the clamp arm can be prevented from being resiliently deformed due to the spring load generated at the clamper restricting member when the clamper is located at the retreat position. Thus, it is possible to prevent any reduction of the clearance between the disk and the clamper, so as to prevent any damage on the disk.

BRIEF DESCRIPTION OF THE DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1:
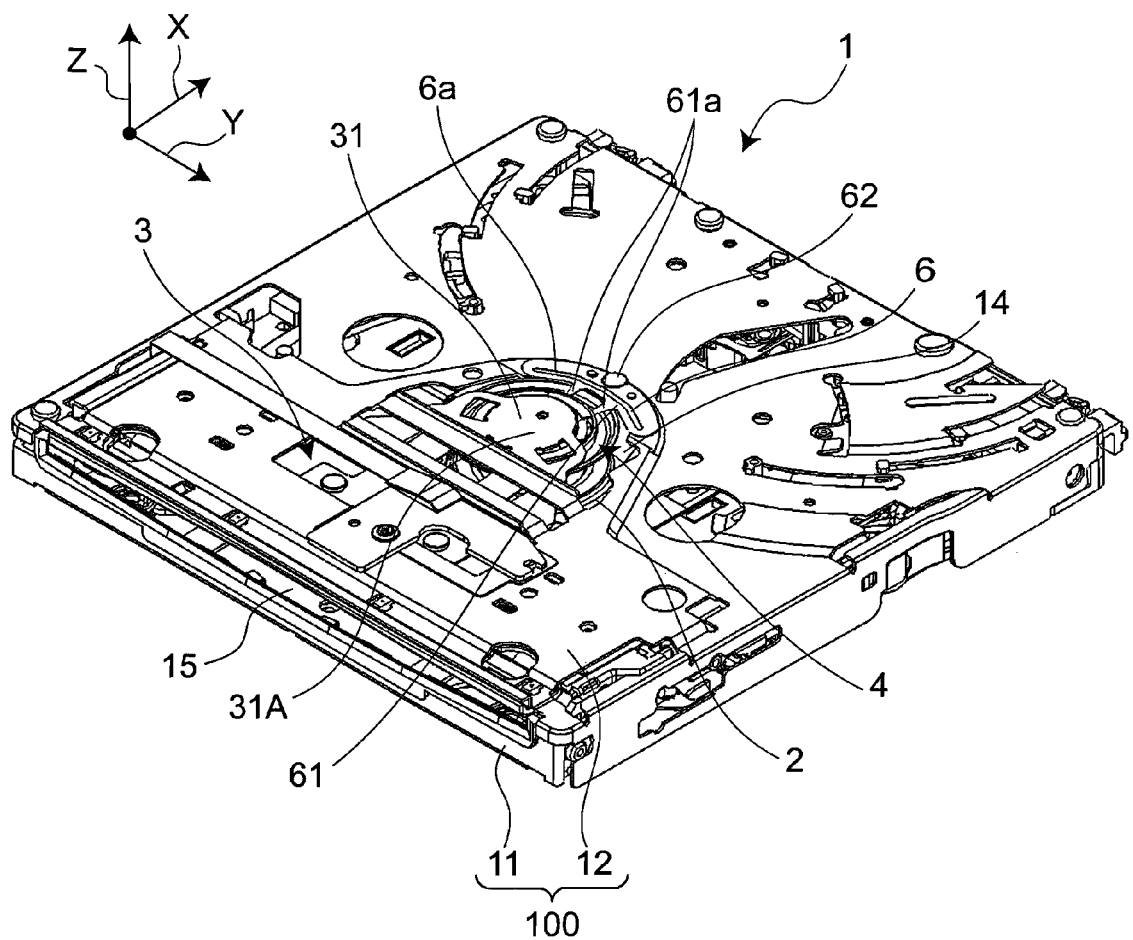
FIG. 1 is a perspective view showing a disk device according to an embodiment of the present invention.

Before the description of the present invention proceeds, it is to be noted that like parts are designated by like reference numerals throughout the accompanying drawings.

A description will be given below of a best preferred embodiment according to the present invention in reference to the attached drawings.

Embodiment

Figure 2:
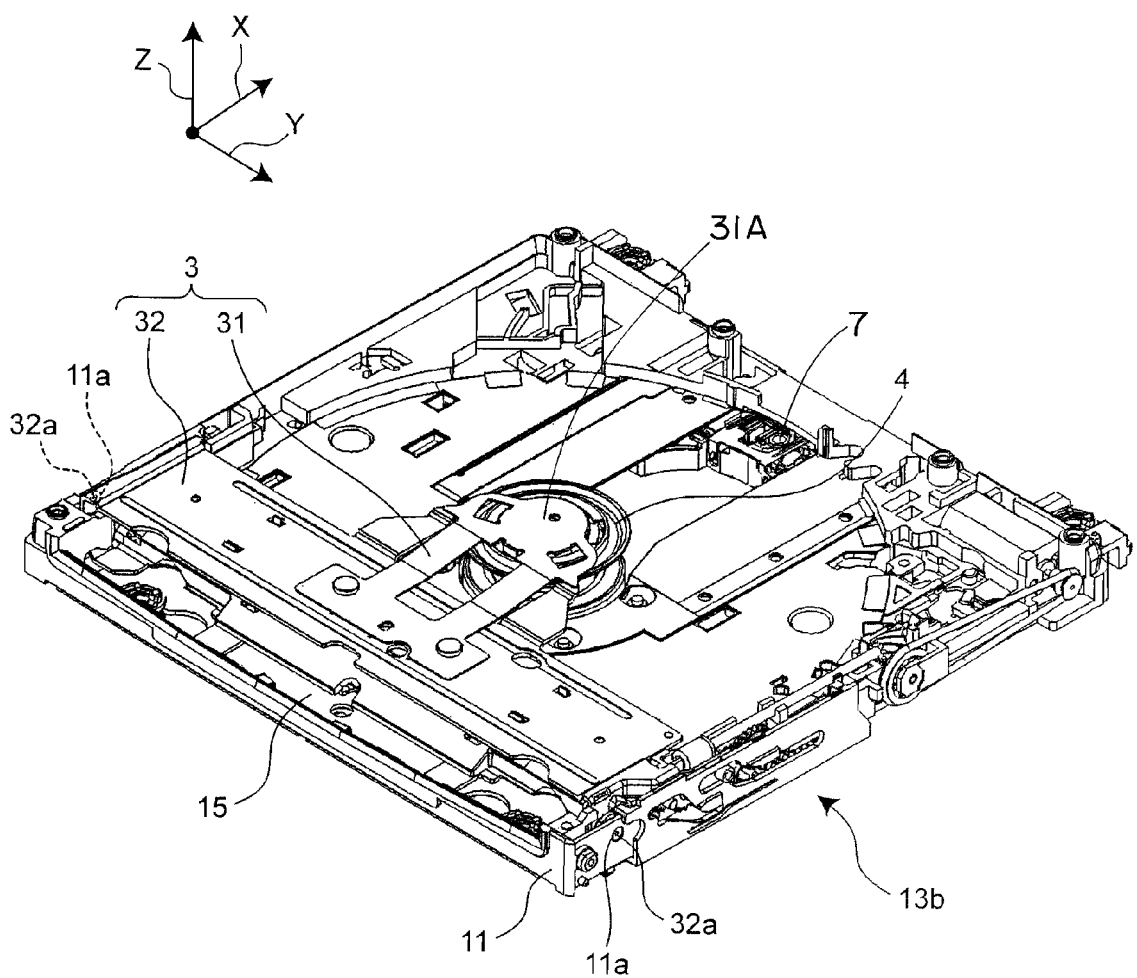
FIG. 2 is a perspective view showing the disk device, from which a cover is detached, according to the embodiment of the present invention.
Figure 3:
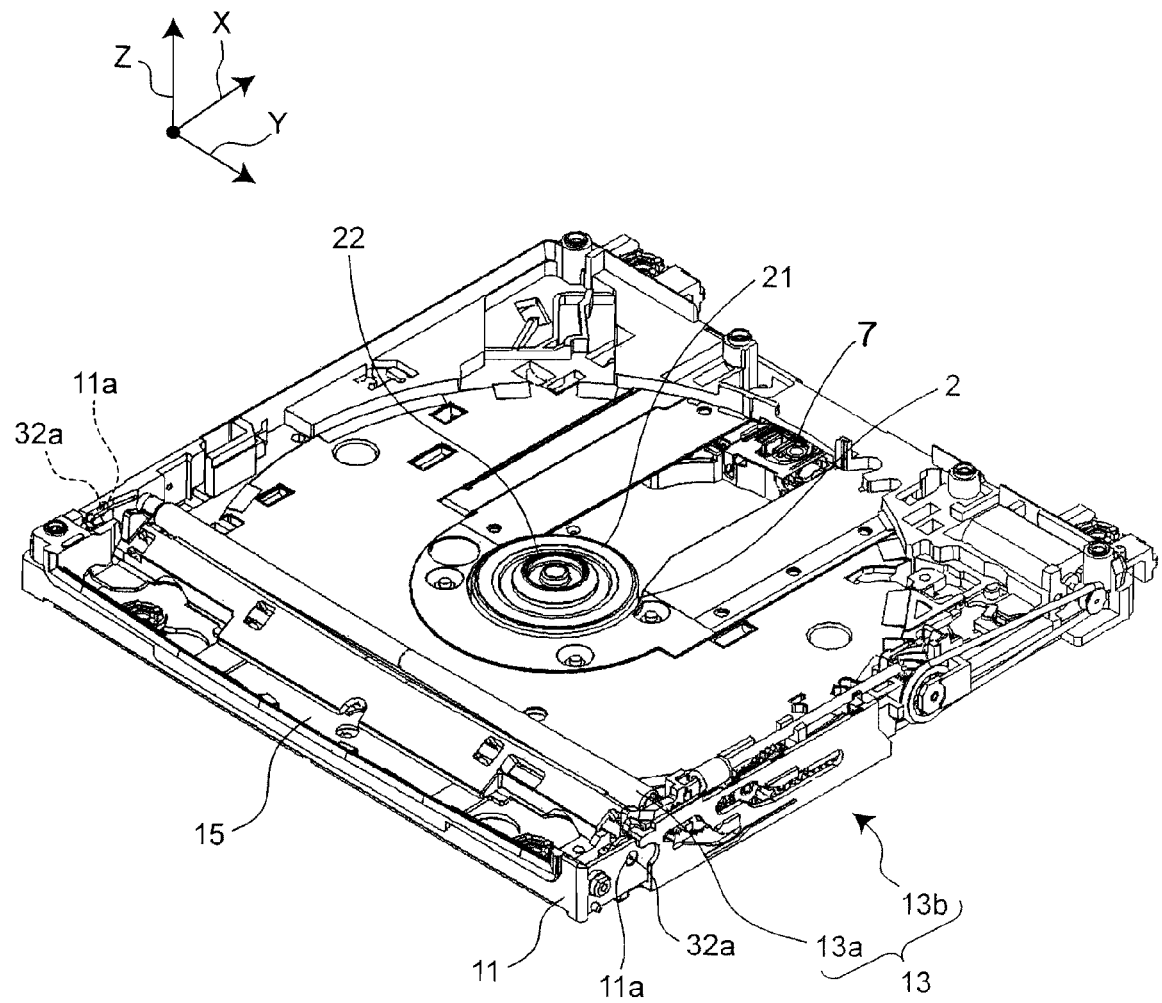
FIG. 3 is a perspective view showing the disk device, from which the cover and a clamp lever are detached, according to the embodiment of the present invention.
Figure 4A:
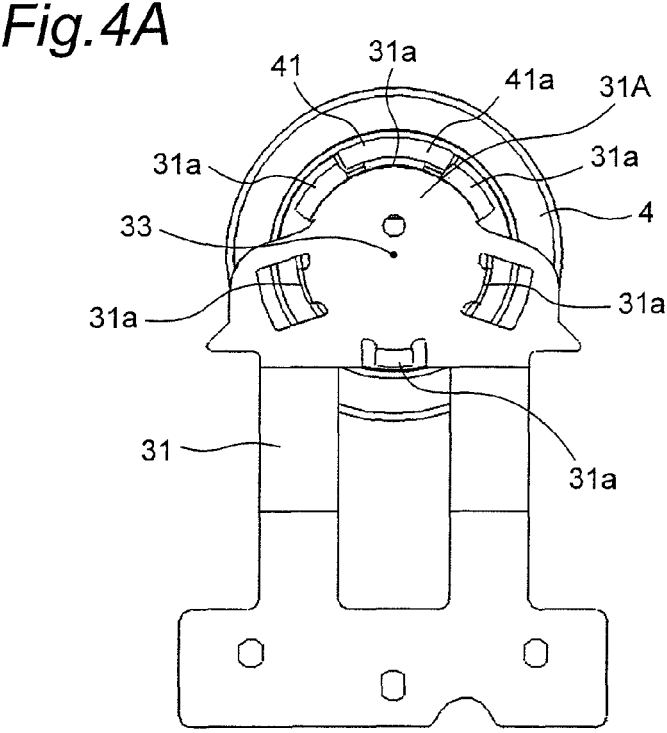
FIG. 4A is a plan view showing a configuration, after a clamp plate and a clamper are assembled, of the disk device according to the embodiment of the present invention.
Figure 4B:
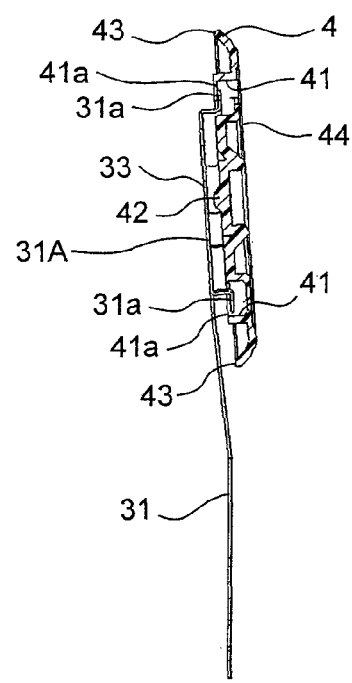
FIG. 4B is a cross-sectional view showing the configuration, after the clamp plate and the clamper are assembled, of the disk device according to the embodiment of the present invention.
Figure 5:
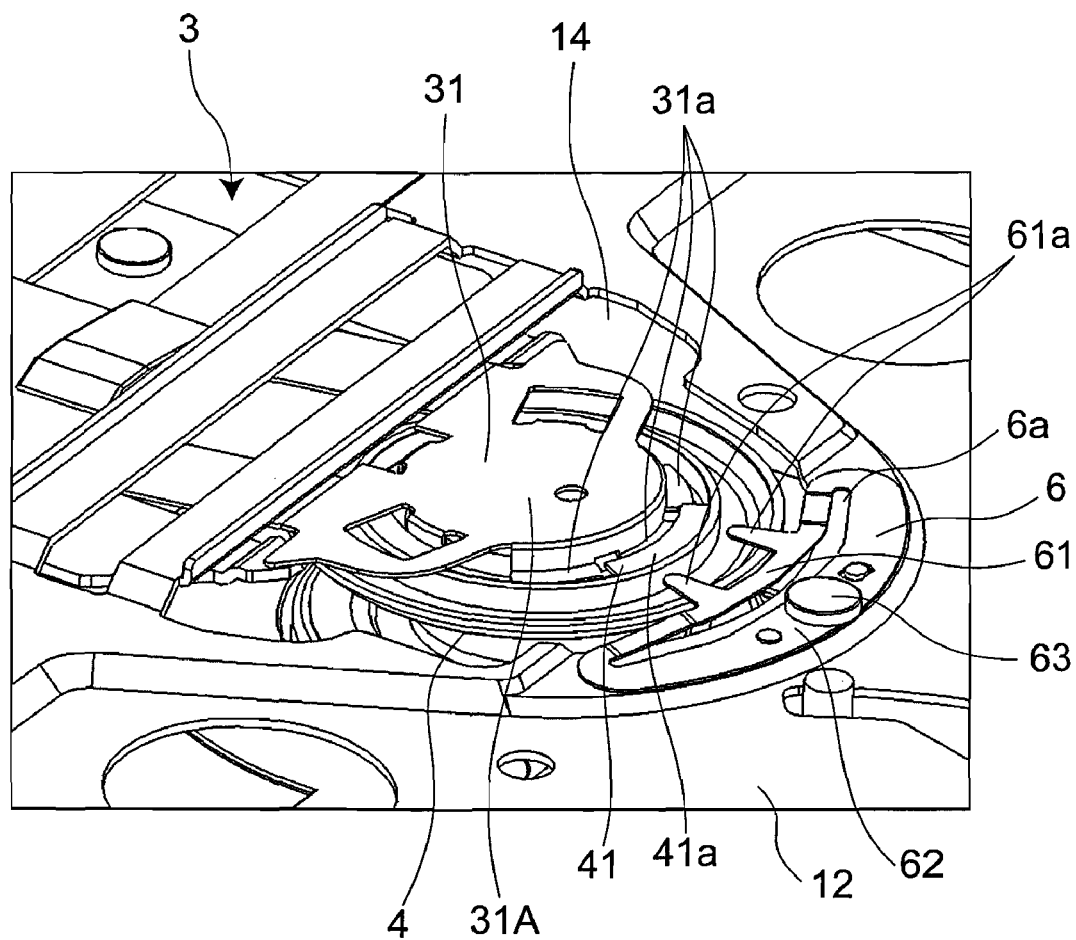
FIG. 5 is a perspective view showing the disk device, in partly enlargement, according to the embodiment of the present invention.
Figure 6A:
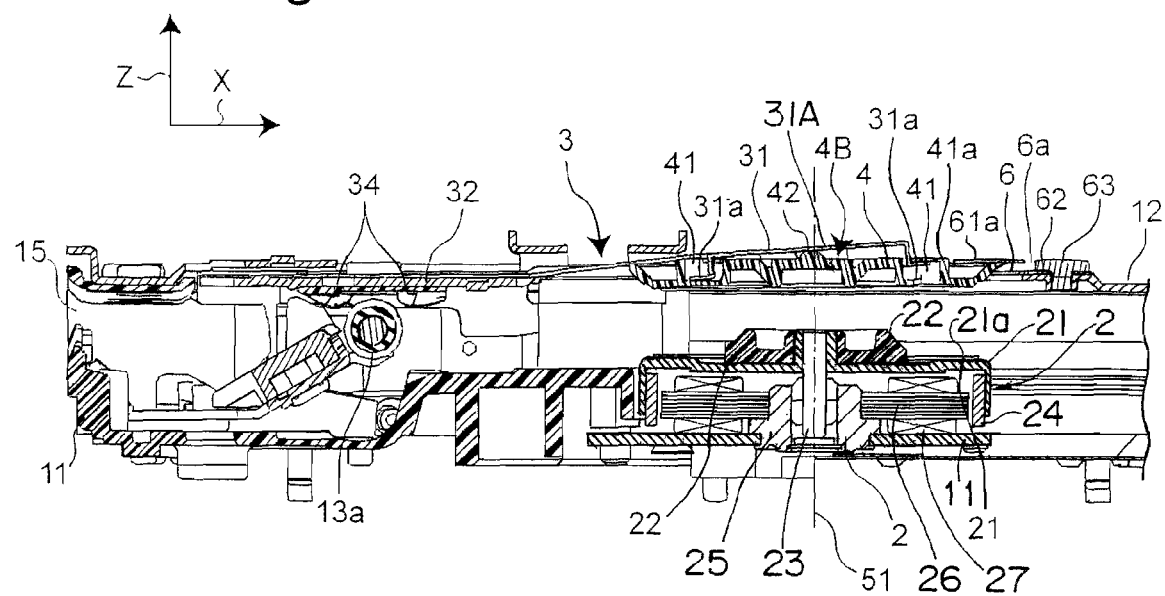
FIG. 6A is a partly cross-sectional view showing the disk device in a state in which no disk is inserted according to the embodiment of the present invention.
Figure 6B:
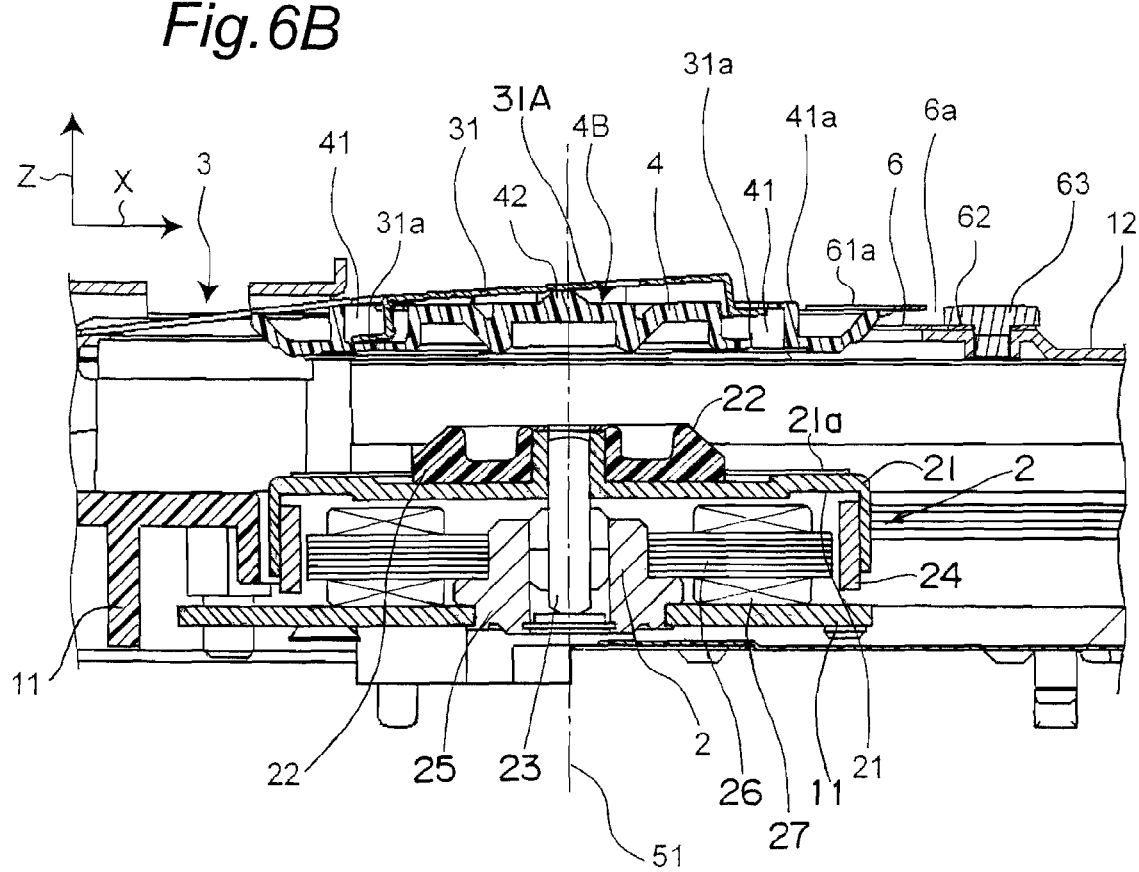
FIG. 6B is a cross-sectional view of FIG. 6A, in partly enlargement.
Figure 7A:
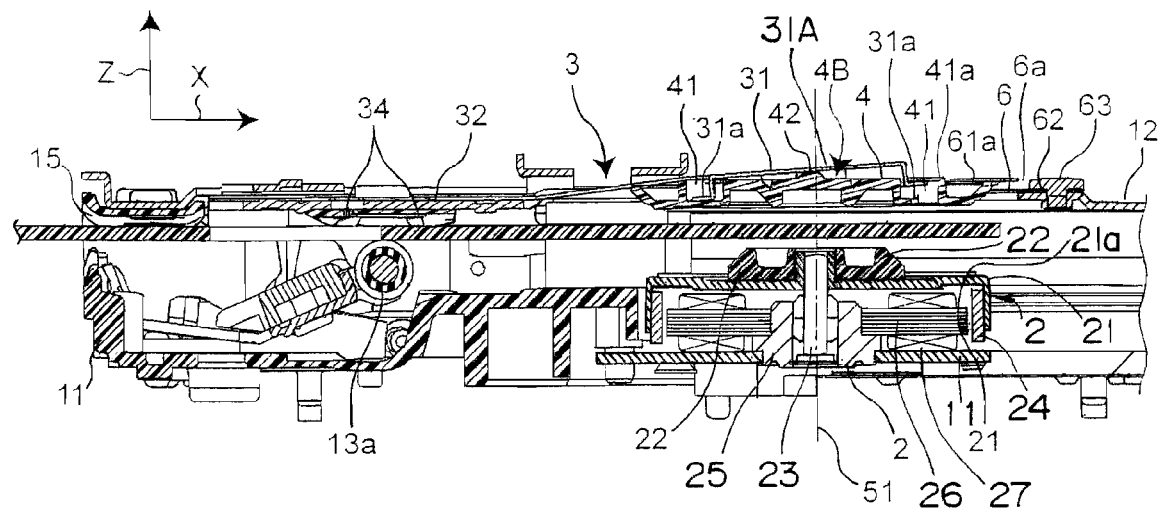
FIG. 7A is a partly cross-sectional view showing the disk device in a state in which a disk is being loaded (when a disk is horizontally carried) according to the embodiment of the present invention.
Figure 7B:
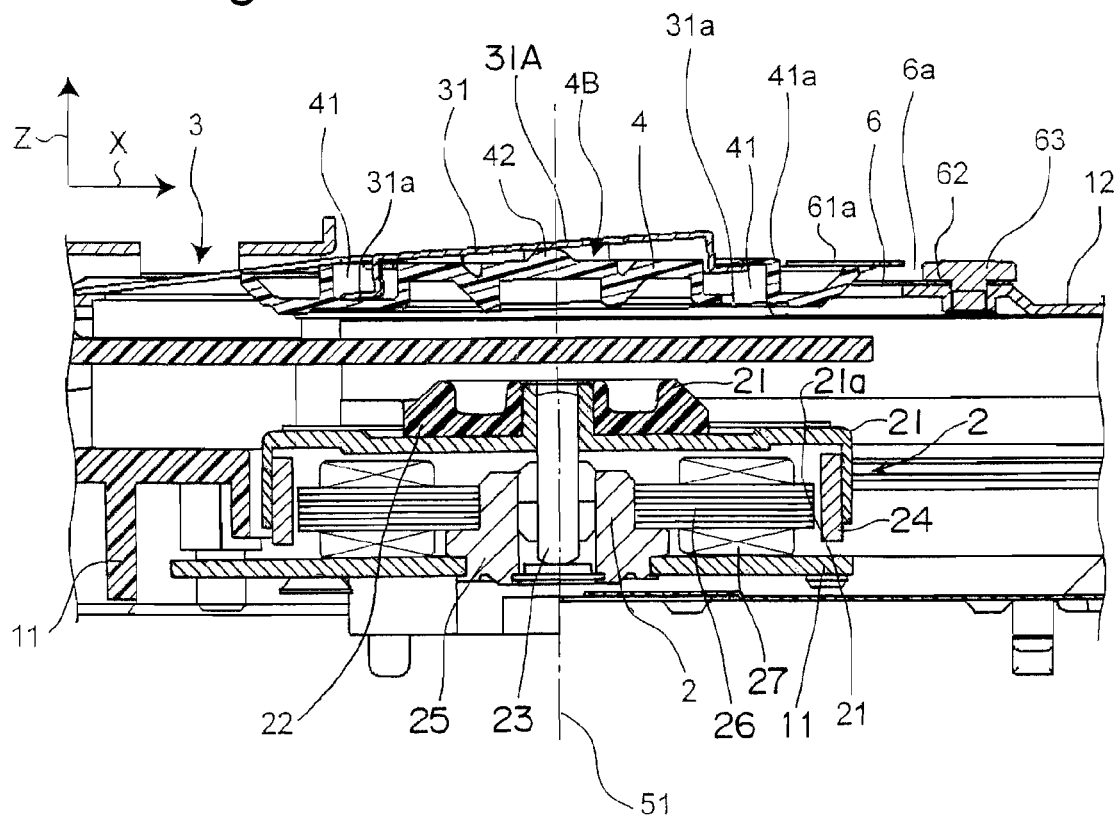
FIG. 7B is a cross-sectional view of FIG. 7A, in partly enlargement.
Figure 8A:
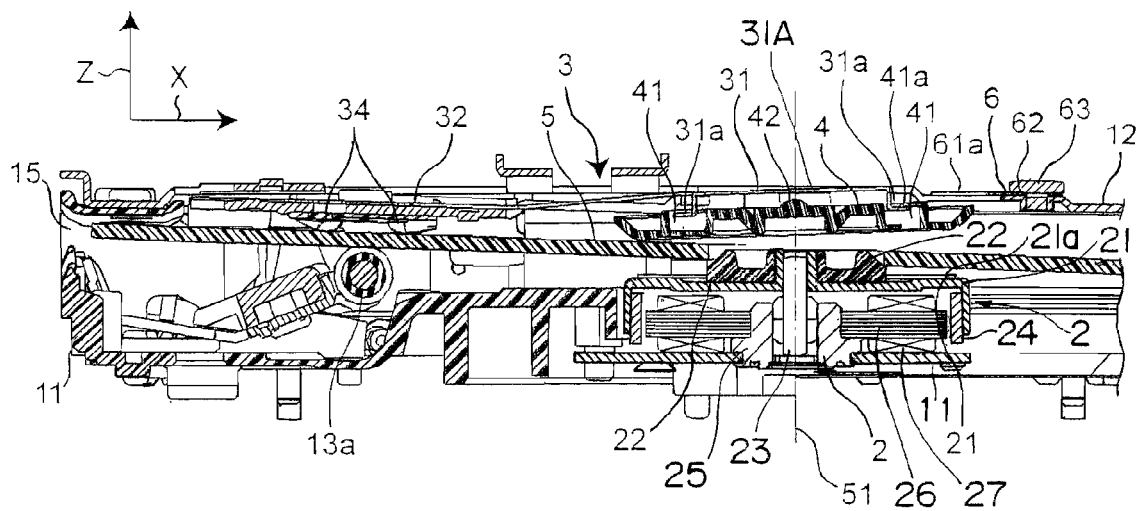
FIG. 8A is a partly cross-sectional view showing the disk device in a state in which the disk is being loaded (when the disk is descended) according to the embodiment of the present invention.
Figure 8B:
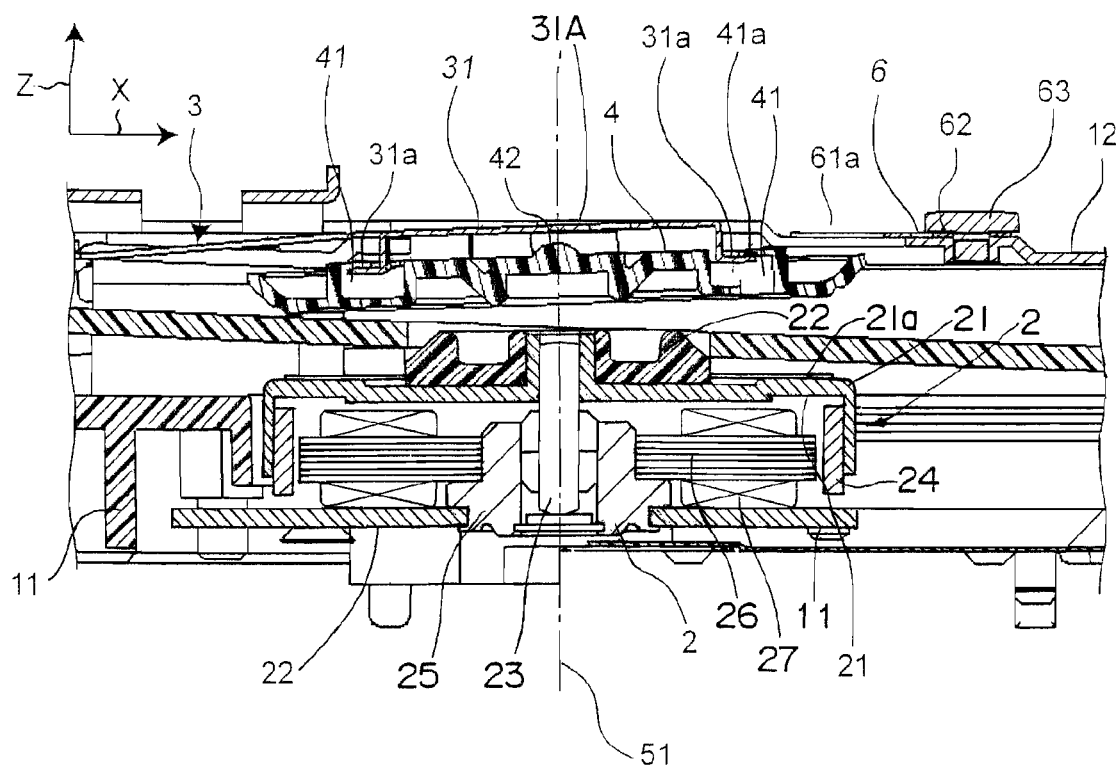
FIG. 8B is a cross-sectional view of FIG. 8A, in partly enlargement.
Figure 9A:
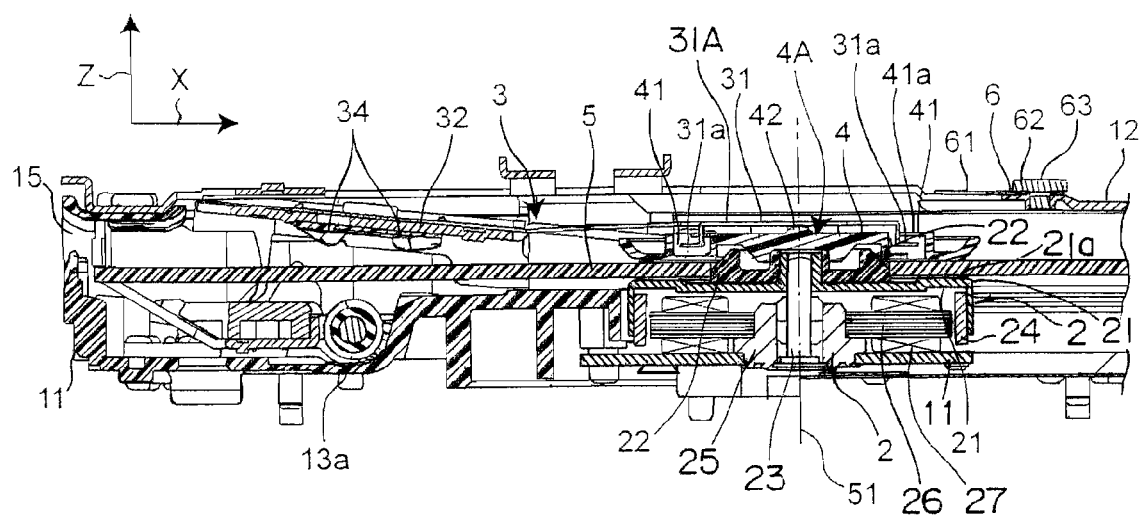
FIG. 9A is a partly cross-sectional view showing the disk device in a state in which the loading of the disk is completed according to the embodiment of the present invention.
Figure 9B:
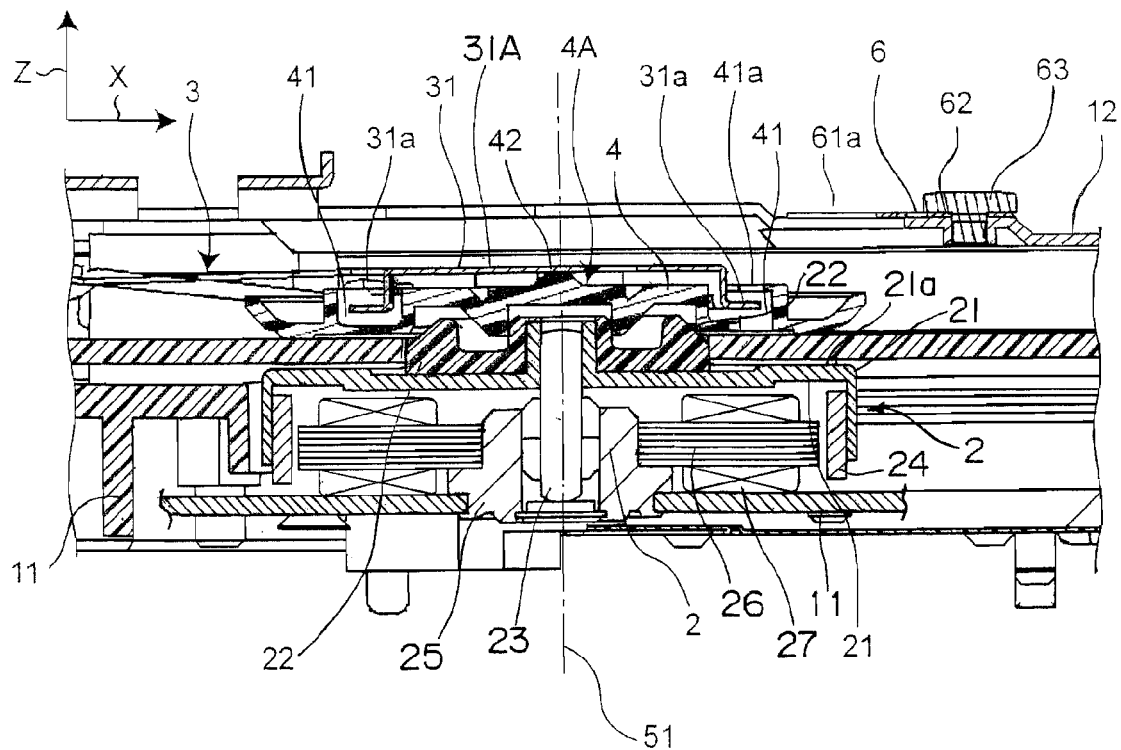
FIG. 9B is a cross-sectional view of FIG. 9A, in partly enlargement.

Explanation will be made on the configuration and operation of a disk device 1 according to an embodiment of the present invention in reference to FIG. 1 to FIGS. 9A and 9B. FIG. 1 is a perspective view showing the disk device 1 as a whole according to the embodiment of the present invention. FIG. 2 is a perspective view showing a configuration in a state in which a cover 12 provided in the disk device 1 is detached. FIG. 3 is a perspective view showing a configuration in a state in which the cover 12 and a clamp lever 32 provided in the disk device 1 are detached. FIG. 4A is a plan view showing a configuration after a clamper 4 and a clamp plate 31 provided in the disk device 1 are assembled. FIG. 4B is a cross-sectional view of FIG. 4A. FIG. 5 is a perspective view showing a configuration around the clamper 4 in the disk device 1, in partly enlargement. FIG. 6A is a partly cross-sectional view showing the disk device 1 in a state before a disk 5 is inserted. FIG. 6B is a cross-sectional view of FIG. 6A, in partly enlargement. FIG. 7A is a partly cross-sectional view showing the disk device 1 in a state in which the disk 5 is being horizontally carried. FIG. 7B is a cross-sectional view of FIG. 7A, in partly enlargement. FIG. 8A is a partly cross-sectional view showing the disk device 1 in a state immediately before the disk 5 is placed on a turntable 22. FIG. 8B is a cross-sectional view of FIG. 8A, in partly enlargement. FIG. 9A is a partly cross-sectional view showing the disk device 1 in a state in which the loading of the disk 5 is completed. FIG. 9B is a cross-sectional view of FIG. 9A, in partly enlargement.

First of all, a description will be given of the entire configuration of the disk device 1.

The disk device 1 according to the embodiment of the present invention is configured by including members and devices for recording and reproducing information in and from a disk-shaped recording medium (hereinafter referred to as "a disk") 5 such as a CD or a DVD loaded inside a casing 100 formed of a support board 11 and the cover 12 disposed so as to cover the upper portion of the support board 11. At one side surface of the casing 100 formed of the support board 11 and the cover 12 is formed a disk insertion port 15, into or from which the disk 5 is inserted or withdrawn.

The casing 100 includes: a turntable 21 which is rotationally driven by a spindle motor 2, for placing the disk 5 thereon; the clamper 4 configured to rotatably hold the disk 5 between the turntable 21 and the clamper 4; a loading mechanism 13 for carrying, between the turntable 21 and the clamper 4, the disk 5 inserted into the casing 100 from outside through the disk insertion port 15; a clamp arm 3 which extends in a disk carrying-in direction X, rotatably holds the clamper 4 at an end downstream in the disk carrying-in direction X, and is disposed pivotably on a pivotal axis (a straight line connecting shafts 32a and 32a) extending in a width direction Y perpendicular to the disk carrying-in direction X upstream in the disk carrying-in direction X; and an optical pickup 7 for reading and writing information from and in the disk 5.

As shown in FIG. 1, the cover 12 has an opening 14 at the center thereof. Downstream in the disk carrying-in direction X around the opening 14 (i.e., on a side apart from the pivotal axis of the clamp arm 3) is fixed a clamper spring 6 exemplifying a clamper restricting member for restricting motion of the clamper 4 in a rotary shaft direction Z perpendicular to the disk carrying-in direction X and the width direction Y.

Hereinafter, explanation will be made in more detail on the configurations of the members and devices in the disk device 1.

The turntable 21 includes a rotor constituting the spindle motor 2. The spindle motor 2 includes the rotor, a centering ring 22, a rotating body 23, a magnet 24, a bearing 25, a core 26 and a coil 27. The rotor, that is, the turntable 21 is formed into a shape of a cup opened downward (i.e., toward the support board 11), has a turntable plane 21a, on which the disk 5 is placed, at the upper surface thereof (i.e., on a side of the cover 12), and further, has an upper cylindrical portion projecting upward at the center of the upper surface thereof. The centering ring 22 is fitted around the upper cylindrical portion and in vicinity of the upper cylindrical portion on the turntable plane 21a in the turntable 21, to achieve centering by holding a center hole of the disk 5. The rotating body 23 is formed into a shape of a rod, and further, integrally holds, at the upper end thereof, the inner circumference of the upper cylindrical portion of the turntable 21. The magnet 24 is formed into a shape of a ring at the inner circumferential surface of a lower cylindrical portion of the turntable 21. The bearing 25 is formed into a shape of a cylinder, is disposed integrally with the support board 11, and rotatably holds the lower end of the rotating body 23 at the inner circumferential surface thereof. The core 26 is fixed to the outer peripheral surface of the bearing 25 so as to face the inner circumferential surface of the magnet 24. The coil 27 is wound around the core 26. The spindle motor 2 is configured so as to rotate the magnet 24 facing the core 26 constituted integrally with the support board 11 via the bearing 25 by an electromagnetic force generated between the magnet 24 and the core 26 with the application of a current to the coil 27, thus to turn the turntable 21.

The loading mechanism 13 includes: a roller 13a constituted of a rubber roller which is arranged to extend in the width direction Y in vicinity of the disk insertion port 15 and is made of a substantially cylindrical elastic member and a roller shaft penetrating a hollow portion of the rubber roller; and a drive mechanism 13b which is arranged on one side of the support board 11 extending in the disk carrying-in direction X so as to rotate the roller 13a forward and reversely on the roller shaft and move the roller 13a in the rotary shaft direction Z.

As shown in FIG. 3, the roller 13a is formed in such a manner as to be increased in diameter toward both ends from the center in the width direction Y. A biasing force is exerted onto the roller 13a all the time toward the cover 12 in the rotary shaft direction Z (i.e., upward in FIG. 1) by a resilient member (not shown) such as a helical spring fixed to the support board 11. As a consequence, the disk 5 inserted through the disk insertion port 15 can be held between the roller 13a and a disk guide 34 (see FIG. 6A) provided at the clamp arm 3.

The loading mechanism 13 drives the drive mechanism 13b to thus rotate the roller 13a forward when a sensor (not shown) disposed in vicinity of the disk insertion port 15 detects the disk 5 held in contact between the roller 13a and the clamp arm 3, thereby carrying the disk 5 between the clamper 4 and the spindle motor 2. Moreover, the loading mechanism 13 is configured such that the roller 13a is retreated apart from the disk 5 so as not to interrupt the rotation of the disk 5 when the disk 5 is placed on the turntable 21. Furthermore, the loading mechanism 13 can carry out the disk 5 by operation reverse to the carrying-in operation. In other words, the loading mechanism 13 drives the drive mechanism 13b so as to move the retreated roller 13a and lift up the disk 5 placed on the turntable 21, holds the disk 5 between the roller 13a and the disk guide 34, and in this state, reversely rotates the roller 13a so as to carry out the disk 5.

The clamp arm 3 includes the clamp lever 32 made of a plate-like member extending in the width direction X, and the clamp plate 31 extending in the disk carrying-in direction X and fixed at an end upstream in the disk carrying-in direction X integrally at the center of the clamp lever 32. The clamp plate 31 includes a clamper holder 31A for rotatably holding the clamper 4 at an end downstream in the disk carrying-in direction X.

As shown in FIG. 2, the clamp lever 32 is configured to be pivoted on a straight line (parallel to the width direction Y) connecting the shafts 32a and 32a serving as a center axis by inserting the shafts 32a and 32a disposed at both ends upstream in the disk carrying-in direction X into bearing holes 11a and 11b formed at the support board 11, respectively. Since the clamp plate 31 is fixed integrally with the clamp lever 32, the clamp plate 31 also is turned according to the pivot of the clamp lever 32. In the present embodiment, the clamp plate 31 and the clamp lever 32 constitute an arm unit of the clamp arm 3.

Furthermore, the disk guide 34 (see FIG. 6A) capable of holding the disk 5 inserted through the disk insertion port 15 in cooperation with the roller 13a is disposed at the surface of the clamp lever 32, opposite to the support board 11. When the disk 5 held between the disk guide 34 and the roller 13a is carried between the clamper 4 and the turntable 21 according to the rotation of the roller 13a, the disk guide 34 is formed into such a shape as to guide the disk 5 while the posture of the disk 5 can be kept in parallel to the disk carrying-in direction X. Moreover, the disk guide 34 is made of an elastic material such as a resin in order to prevent any damage on a recorded plane of the disk 5. Incidentally, it is preferable that the clamp lever 32 should have a high rigidity to a certain extent enough to facilitate the fixture of the disk guide 34 and prevent any deformation even with the application of a pressing force by the roller 13a.

At the clamper holder 31A disposed in the clamp plate 31 downstream in the disk carrying-in direction X are formed a plurality of claws 31a fitted to a plurality of hooks 41, described later, of the clamper 4, respectively, so as to rotatably hold the clamper 4. The plurality of hooks 41 and the plurality of claws 31a are fitted to each other with looseness (i.e., clearances) in the thickness and radial directions of the clamper 4 in consideration of dimensional variations of component parts.

The plurality of claws 31a are configured project apart from a point 33 located on an extension of rotational axis 51 passing the rotational center of the clamper 4 when the clamper 4 is fixed so as to be suspended in the thickness direction of the clamp plate 31.

Additionally, the plurality of claws 31a are asymmetrically arranged with respect to the point 33, as shown in FIG. 4A. Specifically, the plurality of claws 31a are arranged in a greater arrangement area or at more arrangement points on a side on which the claw 31a brings into contact with the clamper spring 6 (i.e., upside in FIG. 4A) than on a side on which no claw 31a brings into contact with the clamper spring 6 (i.e., downside in FIG. 4A) and a plurality of resilient claws 61a (see FIG. 5) of the clamper spring 6, described later. FIG. 4A shows an example in which the arrangement area is increased by increasing the area of each of the plurality of claws 31a on the side on which no claw 31a brings into contact with the clamper spring 6. In other words, the area of one of the claws 31a on the side on which the claw 31a brings into contact with the clamper spring 6 is greater than the width of one of the claws 31a on the side on which no claw 31a brings into contact with the clamper spring 6 and than the width of one of the resilient claws 61a of the clamper spring 6. Here, "the area" signifies an area on an XY plane.

The clamp plate 31 is configured such that it pivots the clamper 4 in association with the pivot of the clamp lever 32 in the state in which the clamper 4 is held at the plurality of claws 31a formed at the clamper holder 31A, as described above, to thus move the clamper 4 between a disk pressing position 4A (see FIGS. 9A and 9B) apart by the thickness of the disk 5 from the turntable 21 in the rotary shaft direction Z and a retreat position 4B (see FIGS. 6A and 6B) apart from the turntable 21 beyond the disk pressing position 4A.

Furthermore, the clamp plate 31 is constituted of a leaf spring, and therefore, the clamp plate 31 can be flexed to exert a load for restoring flexure in the disk 5 when the clamper 4 is moved to the disk pressing position 4A so as to press the disk 5 onto the turntable 21, as shown in FIGS. 9A and 9B. With this load, the clamp plate 31 can press the disk 5 against the turntable 21 without any slippage on the turntable 21. Materials of the clamp plate 31 include, for example, a metallic plate having resiliency made of stainless steel and phosphor bronze and the like.

The clamper 4 is formed into a substantially disk shape, and is made of an elastic member such as a resin in order to prevent any damage on the recorded plane of the disk 5. A material of the clamper 4 is exemplified by a resin material excellent in slidability such as a POM. At the center of the clamper 4 on a side onto which the clamp plate 31 is fixed, there is formed a pivot 42 projecting in a semispherical manner. Between the pivot 42 and an outer periphery 43 are formed the plurality of hooks 41. The plurality of hooks 41 are arranged at the same distance between the clamper 4 and the rotational axis 51. Moreover, each of the plurality of hooks 41 is raised in the thickness direction of the clamper 4 so as to project toward the rotational axis 51. The height of each of the plurality of hooks 41 from a disk contact surface 44 (see FIG. 4B) in the thickness direction is set smaller than the height from the disk contact surface 44 to the vertex of the pivot 42. As a consequence, when the disk 5 is placed on the turntable 21, only the pivot 42 brings into contact with the clamp plate 31, as shown in FIGS. 9A and 9B, so that the clamper 4 is rotated in association with the rotation of the disk 5 without any interruption of the rotation of the clamper 4.

As described above, the sufficient clearance is defined between the hook 41 of the clamper 4 and the claw 31a of the clamp plate 31 in consideration of the dimensional variations of the component parts. Therefore, the clamper 4 is suspended by the clearance in the thickness direction of the clamper 4 from the clamp plate 31 by its own weight, to be supported by the clamp plate 31 in the state shown in, for example, FIG. 2.

As shown in FIG. 5, the clamper spring 6 is constituted of a thin metal sheet, and therefore, functions as the leaf spring having a slit 6a formed at the center thereof. Materials of the clamper spring 6 include, for example, a metallic plate having resiliency made of stainless steel and phosphor bronze. In the clamper spring 6, a resilient portion 61 disposed upstream in the disk carrying-in direction X while holding the slit 6a therebetween projects toward the opening 14 of the cover 12, and further, a fixing portion 62 disposed downstream in the disk carrying-in direction X while holding the slit 6a therebetween is secured downstream in the disk carrying-in direction X around the opening 14 of the cover 12 and outside of the casing 100 at a part of the clamper 4 downstream in the disk carrying-in direction X via a screw 63 so as to brought into contact with the disk 5 on an opposite side.

The resilient portion 61 is provided with the plurality of (here, two) resilient claws 61a formed so as to extend in the disk carrying-in direction X, such that the resilient portion 61 can bring into contact with the part of the clamper 4 downstream in the disk carrying-in direction X beyond the rotational axis 51. The plurality of resilient claws 61a are formed substantially symmetric to each other with respect to the plane of the clamper 4 in the disk carrying-in direction X passing the rotational axis 51. In the meantime, the plurality of resilient claws 61a are connected to each other at a portion downstream in the disk carrying-in direction X, at which they do not bring into contact with the clamper 4. With the configuration of the resilient portion 61, as described above, the contact points between the plurality of resilient claws 61a and the clamper 4 are displaced in almost association with each other. Consequently, even if the entire component part is slightly deformed by handling the component part during its machining or assembling time, it is possible to suppress the generation of a large difference in pressing force against the clamper 4 due to an extreme step defined between the plurality of contact points. In this manner, it is possible to prevent any damage on the disk 5 which may be induced by the contact of the disk 5 in the state in which the clamper 4 is largely inclined. In addition, the resilient portion 61 is disposed adjacently to the fixing portion 62 while holding the slit 6a therebetween, thus suppressing the generation of the difference in pressing force against the clamper 4, so as to prevent any damage on the disk 5.

Incidentally, the plurality of resilient claws 61a are described above as the members formed "substantially symmetrically to each other" with respect to the plane passing the rotational axis 51 of the clamper 4 in the disk carrying-in direction X. This is because consideration is given to the difficulty in forming the plurality of resilient claws 61a completely symmetrically to each other due to the dimensional error which may occur since the clamper 4 is a member to be held in the clamp plate 31 of the clamp arm 3 configured in a pivotable manner whereas the clamper spring 6 is a member fixed to the cover 12.

In the meanwhile, the height of the clamper 4 in the rotary shaft direction Z when no disk is inserted is normally varied due to the dimensional variations of all of the component parts in the disk device 1. Therefore, the installation height and the elastic modulus of the clamper spring 6 in the present embodiment are set in such a manner that the clamper spring 6 brings into contact with the clamper 4 all the time so as to exert a restriction force within the range of variations in height. Here, the elastic modulus of the clamper spring 6 is sufficiently smaller than that of the clamp plate 31 constituted of the leaf spring.

Although the entire clamper spring 6 is constituted of the leaf spring in the present embodiment, the entire clamper spring 6 may be constituted of a wire spring. Otherwise, the fixing portion 62 and the resilient portion 61 may be independently constituted of different materials.

Furthermore, although the arm unit of the clamp arm 3 is constituted of the two members, that is, the clamp plate 31 and the clamp lever 32 in the present embodiment, the arm unit may be constituted of a single member by integrating the clamp plate 31 and the clamp lever 32 with each other. In this case, the arm unit may be partly or entirely constituted of a resilient member such as a leaf spring such that the clamper 4 can press the disk 5 in such a manner that the disk 5 cannot slip on the turntable 21.

Next, explanation will be made on the function of the clamper spring 6 in the disk device 1 when no disk 5 is inserted in reference to FIGS. 6A and 6B.

When no disk 5 is inserted, the clamper spring 6 fulfills mainly two functions.

The clamper spring 6 has a first function of eliminating the looseness (i.e., the clearance) defined between the clamper 4 and the clamp plate 31 in the rotary shaft direction Z, so as to enlarge the clearance between the disk 5 and the clamper 4 more than in the related art.

During the unloading (i.e., carrying-out) of the disk 5, the clamp lever 32 and the clamp plate 31 are turned in a direction apart from the turntable 21 by the drive of the loading mechanism 13, and then, the clamper 4 held by the clamp plate 31 is moved to the retreat position shown in FIGS. 6A and 6B. On the way of the movement, the resilient claw 61a of the clamper spring 6 first brings into contact with a part of the clamper 4 downstream in the disk carrying-in direction X. When the clamp lever 32 and the clamp plate 31 are further pivoted in the direction apart from the turntable 21 in this state, the clamper spring 6 constituted of the leaf spring is deformed in contact against the part of the clamper 4 such that the resilient claw 61a is lifted up. The clamper spring 6 presses the part of the clamper 4 toward the turntable 21 by a spring load generated by the deformation. As a consequence, moment acts at a contact portion, serving as a fulcrum, between a fitting portion 41a of the hook 41 of the clamper 4 positioned downstream in the disk carrying-in direction X and the claw 31a of the clamp holder 31A at the clamp plate 31. In this way, the part of the clamper 4 downstream in the disk carrying-in direction X is pressed toward the turntable 21, and at the same time, the part of the clamper 4 upstream in the disk carrying-in direction X (i.e., on the side of the disk insertion port 15) is pressed in the direction apart from the turntable 21, so that a part of the clamper 4 upstream in the disk carrying-in direction X brings into contact with the clamp plate 31. Thus, the clamper 4 is positioned at the retreat position 4B in a posture shown in FIGS. 6A and 6B. At this time, there is no clearance (i.e., no looseness) between the clamper 4 and the clamp plate 31 in the rotary shaft direction Z.

Consequently, the part of the clamper 4 upstream in the disk carrying-in direction X (i.e., on the side of the disk insertion port 15) nearest the turntable 21 is supported at a position apart from the turntable 21 more than in the related art without any clamper spring 6. In this way, the clearance defined between the clamper 4 and the turntable 21 is enlarged, thereby securing a carrier channel of the disk 5 during the disk loading. Here, the elastic modulus of the clamper spring 6 is set to the level sufficiently smaller than that of the clamp plate 31, as described above, and therefore, the clamp plate 31 cannot be resiliently deformed by the spring load generated at the clamper spring 6 when the clamper 4 is located at the retreat position 4B. As a consequence, the clearance defined between the clamper 4 and the turntable 21 cannot be reduced, that is, the clearance defined between the clamper 4 and the disk 5 cannot be reduced, thereby preventing any damage on the disk 5. In contrast, in the case where the elastic modulus of the clamper spring 6 is set to a level equal to or greater than that of the clamp plate 31, the clamper spring 6 cannot be resiliently deformed even in contact against the clamper 4 due to the pivot of the clamper lever 32 and the clamp plate 31, so that the clamper 4 can be positioned at the contact position. As a result, the clearance defined between the clamper 4 and the turntable 21 is enlarged more than that in the configuration in the related art without any clamper spring 6 but is reduced less than the above-described configuration.

Subsequently, the clamper spring 6 has a second function of suppressing the inclination of the clamper 4 in the width direction Y so as to enlarge the clearance defined between the disk 5 and the clamper 4 more than that in the related art.

As described above, the resilient claws 61a of the clamper spring 6 are formed symmetrically with each other with respect to the plane in the disk carrying-in direction X passing the rotational axis 51 of the clamper 4 (see FIG. 5), and further, the resilient claws 61a are adapted to bring into contact with the clamper 4 uniformly in the width direction Y downstream in the disk carrying-in direction X. The plurality of claws 31a of the clamp plate 31 are arranged in the greater arrangement area or at the more arrangement points on the side on which the clamper 4 brings into contact with the clamper spring 6 (i.e., downstream in the disk carrying-in direction X) than on the side on which no clamper 4 brings into contact with the clamper spring 6 (i.e., upstream in the disk carrying-in direction X) and the resilient claws 61a of the clamper spring 6 (see FIG. 4A), as described above.

With the above-described configuration, the resilient claws 61a at the two points apart in the width direction X first press the part of the clamper 4 downstream in the disk carrying-in direction X, so that moment which generates the inclination of the clamper 4 in the width direction Y is generated as a difference between moments generated by loads at the two points. As a consequence, the moment can be suppressed to a level lower than that generated when the part of the clamper 4 is pressed at one point.

Moreover, since the area of the claw 31a of the clamp plate 31 is widely secured to receive the spring load due to the resilient claw 61a of the clamper spring 6, the clamper 4 allows the entire plane of the fitting portion 41a of the hook 41 at one point or the fitting portion 41a of the hooks 41 at two points apart from each other in the width direction Y to bring into contact with the claw 31a downstream in the disk carrying-in direction X irrespective of the phase of the clamper 4, to thus slide the fitting portion 41a along the constitutional surface of the claw 31a. Therefore, the clamper 4 is inclined in the width direction Y with respect to the clamp plate 31, thereby preventing one peripheral side of the clamper 4 in the width direction Y from being moved toward the turntable 21. In addition, it is possible to prevent any reduction of the clearance between the disk 5 and the clamper 4, so as to suppress the damage on the disk.

Furthermore, the resilient claws 61a at the two points in the clamper spring 6 project from an annular portion of a prolate ellipsoid toward the opening 14 of the cover 12, as shown in FIG. 5. In other words, the resilient claw 61a is configured so as to project toward the pivot shaft of the clamp lever 32. Consequently, since the resilient claws 61a at the two points are deviated in substantial association with each other even if the entire component part is slightly deformed by handling the component part during its machining or assembling time, an excessive step between the resilient claws 61a adjacent each other cannot induce a large difference in pressing force against the clamper 4, which cannot be largely inclined in the width direction Y. Thus, it is possible to prevent any damage on the disk 5.

Next, explanation will be made on the disk loading operation in the disk device 1 in the present embodiment. Here, the explanation will be made on the assumption that the disk device 1 is placed while the support board 11 faces downward.

Referring to FIGS. 7A and 7B, a description will be first given during the horizontal carrier of the disk 5 after the start of disk loading.

The disk 5 is inserted into the insertion port 15, and then, the disk 5 brings into contact with between the disk guide 34 of the clamp lever 32 and the roller 13a. The drive mechanism 13b in the loading mechanism 13 is driven, so that the roller 13a is rotated forward, when the sensor (not shown) disposed in vicinity of the disk insertion port 15 detects the disk 5. The forward rotation of the roller 13a allows the disk 5 to be held between the disk guide 34 fixed to the clamp lever 32 and the roller 13a, and then, to be horizontally carried to between the clamper 4 and the turntable 21 while its posture is controlled by the disk guide 34, as shown in FIGS. 7A and 7B.

At this time, the clamper 4 and the clamper spring 6 are positioned in the same state as that when no disk 5 is inserted since the clamp lever 32 is not pivoted. That is to say, the clamper 4 upstream in the disk carrying-in direction X is lifted up in the direction apart from the turntable 21 by the clamp plate 31 fixed to the clamp lever 32, and therefore, is held at the retreat position 4B apart from the turntable 21 more than in the related art in the state in which the inclination of the clamper 4 is suppressed in the width direction Y. Consequently, it is possible to secure the clearance between the clamper 4 and the turntable 21.

Incidentally, during the disk loading, vibrations generated in a drive system (not shown) such as the roller 13a are generally transmitted to the entire disk device 1. Therefore, the clamper 4, which is a relatively light component part, is vibrated within the looseness (i.e., the clearance) between the clamp plate 31 holding the clamper 4 therein and the clamper 4, and as a result, the clearance between the disk 5 and the clamper 4 may be reduced. However, in the disk device 1 in the present embodiment, the clamper spring 6 urges the clamper 4 against the clamp plate 31, thereby eliminating the clearance (i.e., the looseness). Thus, it is possible to suppress the reduction of the clearance between the disk 5 and the clamper 4 due to the vibrations.

Subsequently, operation for placing the disk 5 on the turntable 21 will be described in reference to FIGS. 8A and 8B.

As soon as the disk 5 is horizontally carried to a position, at which the center of the disk 5 accords with the rotational axis 51 of the turntable 21, between the clamper 4 and the turntable 21, the clamper lever 32 and the clamp plate 31 are pivoted, and then, the clamper 4 held by the clamp plate 31 is started to be moved from the retreat position 4B to the disk pressing position 4A. At this time, the disk guide 34 fixed to the clamper lever 32 is inclined according to the turn of the clamper lever 32, so that the disk 5 held between the roller 13a and the disk guide 34 is moved in a direction toward the turntable 21, as shown in FIGS. 8A and 8B.

Here, the clamper 4 is released from the contact state against the clamper spring 6 owing to its movement in the direction near the turntable 21, to be held in a state suspended from the clamp plate 31 by its own weight. Incidentally, although the clamper 4 brings into contact with the disk 5 on the way of the movement of the clamper 4 from the retreat position 4B to the disk pressing position 4A, the disk 5 and the clamper 4 cannot be moved in the disk insertion direction X and the width direction Y at the same time. Thus, the disk 5 cannot be damaged by surface slide of the clamper 4.

Next, operation till the completion of the loading of the disk 5 will be described in reference to FIGS. 9A and 9B.

When the pivot of the clamper lever 32 and the clamp plate 31 further moves the disk 5 toward the turntable 21 and moves the clamper 4 to the disk pressing position 4A, the disk 5 is positioned with the center hole thereof being guided by the centering ring 22 of the spindle motor 2, to be then placed on the turntable 21.

At a timing when the disk 5 is brought into contact with the turntable 21, the roller 13a is moved in a direction apart from the disk 5 by the drive of the drive device 13b (downward in FIGS. 9A and 9B). As a consequence, the disk 5 is released from being held between the roller 13a and the disk guide 34 of the clamper lever 32. Moreover, at this time, the clamp plate 31 directly urges the pivot 42 of the clamper 4, presses the disk 5 via the clamper 4, and thus, urges the disk 5 against the turntable 21.

The disk 5 is placed on the turntable 21, and then, is brought into close contact with the clamper 4. Thereafter, when the clamp lever 32 is further pivoted, the clamp plate 31 fixed at one end thereof to the clamp lever 32 is deformed upon receipt of reaction force from the pivot 42 of the clamper 4. With this deformation, the clamp plate 31 serving as the leaf spring generates the spring load with respect to the pivot 42, thereby pressing the disk 5 by a force enough to prevent the disk 5 from being slipped on the turntable 21. In this manner, upon completion of the loading of the disk 5, the disk device 1 comes into a state shown in FIGS. 8A and 8B. Incidentally, at this time, the roller 13a is retreated to a position sufficiently apart from the disk 5, and therefore, the roller 13a can never inhibit the rotation of the disk 5.

In the above-described manner, the disk loading operation comes to an end in the disk device 1 in the present embodiment. A disk unloading operation (i.e., a disk carrying-out operation) can be performed reversely to the disk loading operation. Therefore, a detailed description of the disk unloading operation will be omitted below.

Figure 10:
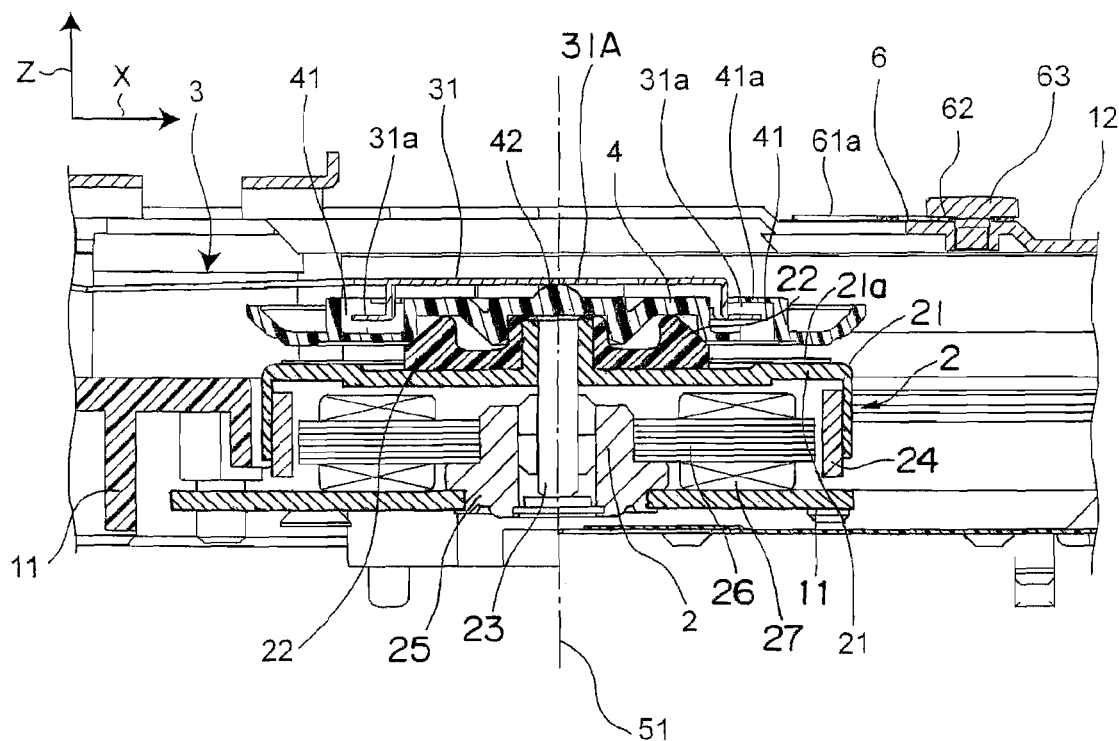
FIG. 10 is a cross-sectional view showing, in partly enlargement, a state in which a drop impact is exerted on the disk device while a support board faces downward according to the embodiment of the present invention.
Figure 11:
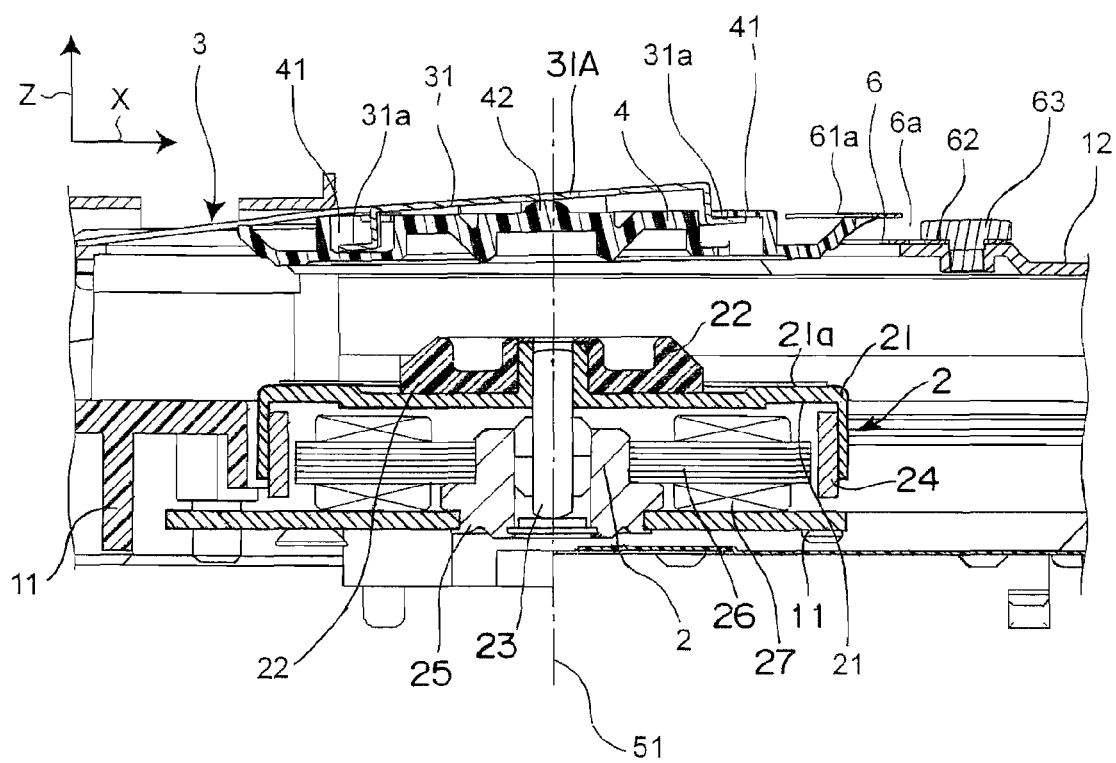
FIG. 11 is a cross-sectional view showing, in partly enlargement, a state in which the drop impact is exerted on the disk device while the cover faces downward according to the embodiment of the present invention.
Figure 12A:
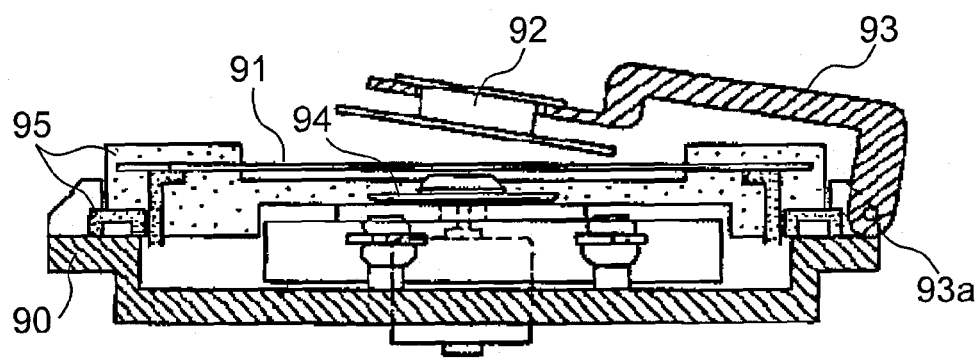
FIG. 12A is a cross-sectional view showing, in partly enlargement, a conventional disk device in a state in which a disk is being loaded.
Figure 12B:
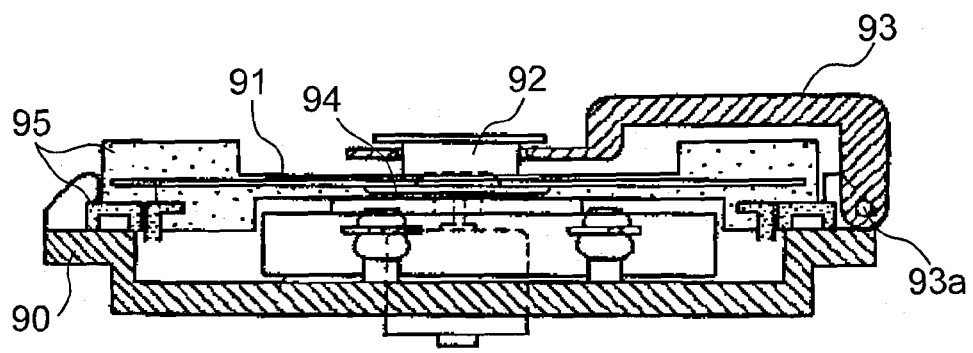
FIG. 12B is a cross-sectional view showing, in partly enlargement, the conventional disk device in a state in which the loading of the disk is completed.

Next, a behavior in the case where a drop impact is exerted on the disk device 1 in the state in which the disk 5 is not inserted will be explained in reference to FIGS. 6A, 6B, 10 and 11. FIG. 10 is a cross-sectional view showing, in partly enlargement, a state in which a drop impact is exerted on the disk device 1 while the support board faces downward; and FIG. 11 is a cross-sectional view showing, in partly enlargement, a state in which a drop impact is exerted on the disk device 1 while the cover faces downward. Here, it is preferable that the hook 41 of the clamper 4 should be formed in suppressed thickness in consideration of the thinness of the disk device 1. However, in the case of the formation in the suppressed thickness, the hook 41 made of the resin is liable to be broken due to an impact in a thickness direction of the clamper 4. In view of this, explanation will be made below on the case where a drop impact is exerted in the rotary shaft direction Z of the disk device 1.

First of all, a description will be given of the case where the disk device 1, in which the clamper 4 is located at the retreat position 4B, drops down while the support board 11 faces downward, and then, the drop impact is exerted in the rotary shaft direction Z, as shown in FIGS. 6A and 6B.

When the drop impact is exerted on the disk device 1 while the support board 11 faces downward, the clamper 32 and the clamp plate 31 will be pivoted toward the turntable 21 with the application of an impact acceleration. In the disk device 1 in the present embodiment, the clamper 32 is normally supported by the cover 12 to maintain the posture shown in FIGS. 6A and 6B. However, the drop impact largely resiliently deforms the clamper 32 and the clamp plate 31 as a whole. As a consequence, the clamper 4 held by the clamp plate 31 is released from the contact against the resilient claw 61a of the clamper spring 6 at a part of the clamper 4 downstream in the disk carrying-in direction X, and then, collides with the turntable 21 in the state shown in FIG. 10. At this time, the impact of the collision is exerted on mainly the pivot 42 and the reverse surface, but not on the hook 41. As a consequence, the hook 41 cannot be broken even if it is formed of a structurally weak member having the suppressed thickness.

Energy of the drop impact at this time is reduced by amount converted from energy applied to the clamp lever 32 or the clamp plate 31 into resilient energy due to the deformation of the clamp plate 31 since the clamp plate 31 is constituted of the leaf spring. As a result, the clamper 4 can be suppressed from being broken.

Next, explanation will be made on the case where the drop impact is exerted in the rotary shaft direction Z since the disk device 1 in the state in which the clamper 4 is located at the retreat position 4B drops down while the cover 12 faces downward, as shown in FIGS. 6A and 6B.

When the drop impact is exerted on the disk device 1 while the cover 12 faces downward, the clamp lever 32 and the clamp plate 31 will be pivoted onto the cover 12 side with the application of the impact acceleration. In the disk device 1 in the present embodiment, the clearance between the clamp lever 32 and the cover 12, and the clearance between the clamp plate 31 and the cover 12 are only slightly small, as shown in FIG. 6A, for the purpose of the thinness. Therefore, the clamp plate 31 is pivoted integrally with the clamp lever 32, and then, directly collides with the cover 12, as shown in FIG. 11. At this time, the clamper 4 held at the end of the clamp plate 31 is moved toward the cover 12 side (i.e., upside in FIG. 11) from the normal retreat position 4B against the restriction force of the clamper spring 6. At this time, since the clamper spring 6 is constituted of the leaf spring and its elastic coefficient is set to be sufficiently smaller than that of the clamp plate 31 in the disk device 1 in the present embodiment, the clamper spring 6 is resiliently deformed so as to buffer the load of the drop impact, and further, the clamper 4 receives a small suppressed resiliency from the clamper spring 6 which is resiliently deformed following the movement of the clamper 4. As a consequence, it is possible to reduce a stress generated in the hook 41 which receives the load of the drop impact exerting on the clamper 4, so as to restrain the breakage of the hook 41.

Here, if the clamper spring 6 is constituted of not the resilient member such as the leaf spring but a rigid member, the clamper 4 is partly restricted downstream in the disk carrying-in direction X by the clamper spring 6. Therefore, the clamper 4 cannot be moved from the retreat position 4B in the direction farther apart from the turntable 21 (upward in FIG. 11), and in this state, the fitting portion 41a of the hook 41 instantaneously receives the load of the drop impact with the application of the impact acceleration exerted from the claw 31a of the clamp plate 31 to the clamp lever 32 and the clamp plate 31. Consequently, the fitting portion 41a of the hook 41, which is formed in particularly reduced thickness for the purpose of the thinness, is low in strength, and therefore, is presumed to be easily broken.

With the above-described configuration, the disk device 1 in the present embodiment can greatly eliminate the problem of the breakage of the clamper 4 owing to the clamper spring 6, thus achieving both of the thinness of the disk device 1 and the suppression of the breakage of the clamper 4 despite of the drop impact.

Incidentally, the present invention is not limited to the above-described embodiment, and therefore, may be modified in other various modes.

Although the pivot shaft of the clamp arm 3 (i.e., the clamp plate 31 and the clamp lever 32) is located upstream in the disk carrying-in direction X (i.e., on the disk insertion port 15 side) in the above-described embodiment, the present invention is not limited to this. For example, the pivot shaft of the clamp arm 3 may be located downstream in the disk carrying-in direction X (i.e., on the back in the device apart from the disk insertion port 15). In such a case, the clamper spring 6 exemplifying the clamper restricting member may be disposed upstream in the disk carrying-in direction X beyond the clamp holder 31A of the clamp plate 31.

INDUSTRIAL APPLICABILITY

The disk device according to the present invention is usable to a recorder/reproducer such as a CD or a DVD whose disk-shaped recording medium can be replaced with another by a user since the disk can be prevented from being damaged, and further, the thinness of the device can be further achieved. Moreover, the disk device according to the present invention is particularly usable to a disk device whose thinness is required due to the use of combination with various other equipment, such as a vehicle-mounted disk device or a disk device to be incorporated in a television game machine.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2006-309110 filed on Nov. 15, 2006, including specification, claims, drawings, and summary are incorporated herein by reference in its entirety.

The invention claimed is:

1. A disk device comprising:
a turntable housed inside a casing, which is rotationally driven by a spindle motor and, for placing a disk thereon;
a clamper for rotatably holding the disk between the turntable and the clamper, which has a hook on a side opposite to a side on which the disk is held;
a loading mechanism for carrying the disk inserted from outside of the casing to between the turntable and the clamper;
a clamp arm which includes a clamper holder for rotatably holding the clamper by a claw fitted to the hook of the clamper with a clearance in a thickness direction of the clamper and an arm unit extending from the clamper holder and disposed pivotably on a pivot shaft positioned apart from the clamper holder, the clamp arm moving the clamper between a disk pressing position at which the disk is pressed onto the turntable and a retreat position apart from the disk pressing position toward a side remote from the turntable according to the pivot of the arm unit; and
a clamper restricting member including a resilient portion formed with a plurality of resilient claws so that the resilient claws can be brought into contact with an outer periphery of the clamper on the side opposite to the side, on which the disk is held, and on a side apart from the pivot shaft of the arm unit with the clamper moved to the retreat position;
wherein the clamper restricting member is formed so that its position is apart from the pivot shaft of the arm unit more than the center of rotation of the clamper, and the plurality of resilient claws are connected to each other at portions out of contact with the outer periphery of the clamper, thus to be integrated with each other, and
wherein the outer periphery of the clamper is moved to the retreat position by the pivot of the arm unit of the clamp arm and is brought into contact with the resilient claws of the clamper restricting member so as to be restricted, whereby moment acts at a contact portion, serving as a fulcrum, between the hook of the clamper and the claw of the clamp holder, and a side near the pivot shaft of the arm unit of the clamper is pivoted in a direction apart from the turntable.

2. A disk device as claimed in claim 1, wherein the clamper restricting member includes a leaf spring having an opening at a center thereof.

3. A disk device as claimed in claim 2, wherein the arm unit of the clamp arm is partly or entirely constituted of a resilient member; and
an elastic modulus of the resilient member is greater than that of the resilient portion of the clamper restricting member.

* * * * *